United States Patent
Futawatari

(10) Patent No.: US 6,360,185 B1
(45) Date of Patent: Mar. 19, 2002

(54) INFORMATION PROCESSING APPARATUS AND CONTROL METHOD OF THE SAME

(75) Inventor: Masashi Futawatari, Gunma (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/148,464

(22) Filed: Sep. 4, 1998

(30) Foreign Application Priority Data

Sep. 4, 1997 (JP) .............................. 9-239797

(51) Int. Cl.[7] .................................................. H05K 7/20
(52) U.S. Cl. ...................................... 702/182; 713/300
(58) Field of Search ................................ 702/182, 132; 713/300, 320, 322, 323, 324, 330

(56) References Cited

U.S. PATENT DOCUMENTS

| | | | | |
|---|---|---|---|---|
| 5,043,642 A | * | 8/1991 | Ohi | 318/254 |
| 5,764,506 A | * | 6/1998 | Eynaud | 364/141 |
| 5,778,026 A | * | 7/1998 | Zak | 315/219 |
| 5,848,282 A | * | 12/1998 | Kang | 395/750.05 |
| 5,906,315 A | * | 5/1999 | Lewis et al. | 236/49.3 |
| 5,926,386 A | * | 7/1999 | Ott et al. | 364/175 |
| 5,930,557 A | * | 7/1999 | Sasahara et al. | 399/91 |
| 5,958,055 A | * | 9/1999 | Evoy et al. | 713/310 |
| 5,963,887 A | * | 10/1999 | Giorgio | 702/64 |
| 6,014,611 A | * | 1/2000 | Arai et al. | 702/132 |
| 6,029,119 A | * | 2/2000 | Atkinson | 702/132 |
| 6,058,012 A | * | 5/2000 | Cooper et al. | 361/704 |
| 6,122,749 A | * | 9/2000 | Gulick | 713/324 |
| 6,134,667 A | * | 10/2000 | Suzuki et al. | 713/300 |

FOREIGN PATENT DOCUMENTS

JP          8-65612          3/1996

* cited by examiner

Primary Examiner—Patrick Assouad
(74) Attorney, Agent, or Firm—Ostrolenk, Faber, Gerb & Soffen, LLP

(57) ABSTRACT

An information processing apparatus includes: a power supply for supplying a power; a sound collector for collecting a noise caused by the surroundings to output a sound volume; a sound volume recognizer calculated a measuring value from the sound volume to compare the measuring value with a reference value and output a revolution control signal and a sound level signal; a voltage controller for controlling the power supplied from the power supply in response to the revolution control signal; a blower having a fan rotated with the power supplied from the power source to cool inside the apparatus; an operation setting unit for producing and outputting an operational signal indicative of a processing rate in response to the sound level signal; and a central processing unit changed the processing rate in accordance with the operational signal to perform operation, thereby controlling the number of revolution of the blower in response to a noise and the processing rate of the central processing unit to restrain calorific value caused by the apparatus.

13 Claims, 2 Drawing Sheets

INFORMATION PROCESSING APPARATUS AND CONTROL METHOD OF THE SAME

BACKGROUND OF THE INVENTION

1. Field of the Invention

The present invention relates to an information processing apparatus and control method, more particularly to an information processing apparatus and control method capable of changing the number of revolution of a blower and a processing rate of a processor in response to a noise caused by surroundings.

2. Description of the Related Art

Conventionally, there has been proposed an information processing apparatus having a blower rotated at a certain rotational speed to cool inside the apparatus with a power switch on. In this case, the noise of blower remains unchanged, but in the case where the surrounding of the information processing apparatus is quiet, the blower noise offends our ears.

Japanese Patent Laid-open Publication No. Hei8-65612 has disclosed a "projector" as shown in FIG. 2. Referring to FIG. 2 showing the projector, a microphone 4 is mounted on an outer housing 1 of the projector to collect a noise of surroundings and feed a signal from the microphone 4 to a sound detector 5, calculating the sound volume of noise from the signal. The sound volume is then supplied to a discriminator 7 through a controller 10. The discriminator 7 reads out a reference value of noise level from a memory 6 where the values are previously stored therein, to compare the sound volume with the noise level read out from the memory. The discriminator 7 also outputs command data so that the blower rotates under a state of the noise level suitable for the calculated sound volume. The command data is transferred from the controller 10 to a suction fan driving unit 8 for driving a blower 2 and an exhaust fan driving unit 9 for driving a blower 3, and both the driving units 8, 9 rotate the blowers 2, 3, respectively. Therefore, the blowers 2, 3 of the projector are rotated suitably under the noise of surroundings. Because of this, in the case where the noise of surroundings is relatively low, the projector is cooled with low revolution of the blowers, while the noise thereof is relatively high, it is cooled with high revolution of the blowers. As a result, the noise in the low revolution does not offend our ears where the projector is placed on relatively quiet surroundings. However, the airflow is small and cooling effect is low in rotating the blowers in low revolution, conversely, it is large and high in high revolution.

SUMMARY OF THE INVENTION

It is therefore an object of the present invention to provide an information processing apparatus and control method capable of controlling the blower rotational speed processing rate and heat output of the processor in response to noise of surroundings, thereby enhancing reliability of the apparatus.

According to an aspect of the present invention, there is provided an information processing apparatus including: a power supply for supplying a power; a sound collector for collecting a noise of surroundings, i.e. ambient sound level to output a sound volume; a sound volume recognizer that calculates a measuring value from the sound volume, compares the measuring value with a reference value and outputs a revolution or rotational speed control signal and a sound level signal; a voltage controller for controlling the power supplied from the power supply in response to the rotational speed control signal; a blower having a fan rotated with the power supplied from the power source to cool inside the apparatus; an operation setting unit for producing and outputting an operational signal indicative of a processing rate from the sound level signal; and a central processing unit changed the processing rate in accordance with the operational signal to perform operation of the unit.

The reference value compared with the measuring value may be a predetermined value in a range of operating the apparatus.

The sound volume recognizer may calculate the measuring value from the sound volume to compare the measuring value with the reference value and output a low revolution control signal to the voltage controller and a low sound level signal to the operation setting unit when the measuring value is smaller than the reference value.

The sound volume recognizer may calculate the measuring value from the sound volume to compare the measuring value with the reference value and output a high revolution control signal to the voltage controller and a high sound level signal to the operation setting unit when the measuring value is larger than the reference value.

The voltage controller may transform the power from the power source to supply a high electric power to the blower for high rotational speed operation when the rotational speed control signal is a high revolution control signal, and transform the power from the power source to supply a low electric power to the blower for low rotational speed operation when the revolution control signal is a low revolution control signal.

The operation setting unit may output a high rate operational signal to the central processing unit when the sound level signal is a high sound level signal and output a low rate operational signal to the central processing unit when the sound level signal is a low sound level signal.

The central processing unit may perform a processing operation under a high rate clock frequency when the operational signal is a high rate operational signal, perform the processing operation under a low rate clock frequency when the operational signal is a low rate operational signal, and make the apparatus to be set to a standby state and restrain the calorific value caused by the apparatus.

According to a second aspect of the present invention, there is provided a control method for an information processing apparatus for measuring ambient sound volume, changing the rotational speed of a blower for cooling inside the apparatus, and changing a processing rate to control heat produced from the apparatus, comprising the steps of: (a) collecting ambient noise, and producing a sound volume; (b) calculating a measuring value from the sound volume to compare the measuring value with a reference value and producing a rotational speed control signal and a sound level signal; (c) controlling a power in response to the rotational speed control signal; (d) rotating a fan in a blower with the power to cool inside the apparatus; (e) producing an operational signal indicative of a processing rate in response to the sound level signal; and (f) changing the processing rate in accordance with the operational signal to perform operation of a central processing unit.

BRIEF DESCRIPTION OF THE DRAWINGS

The above and other objects, advantages and features of the present invention will be more apparent from the following description taken in conjunction with the accompanying drawings in which.

DESCRIPTION OF THE PREFERRED EMBODIMENTS

Figure 1:
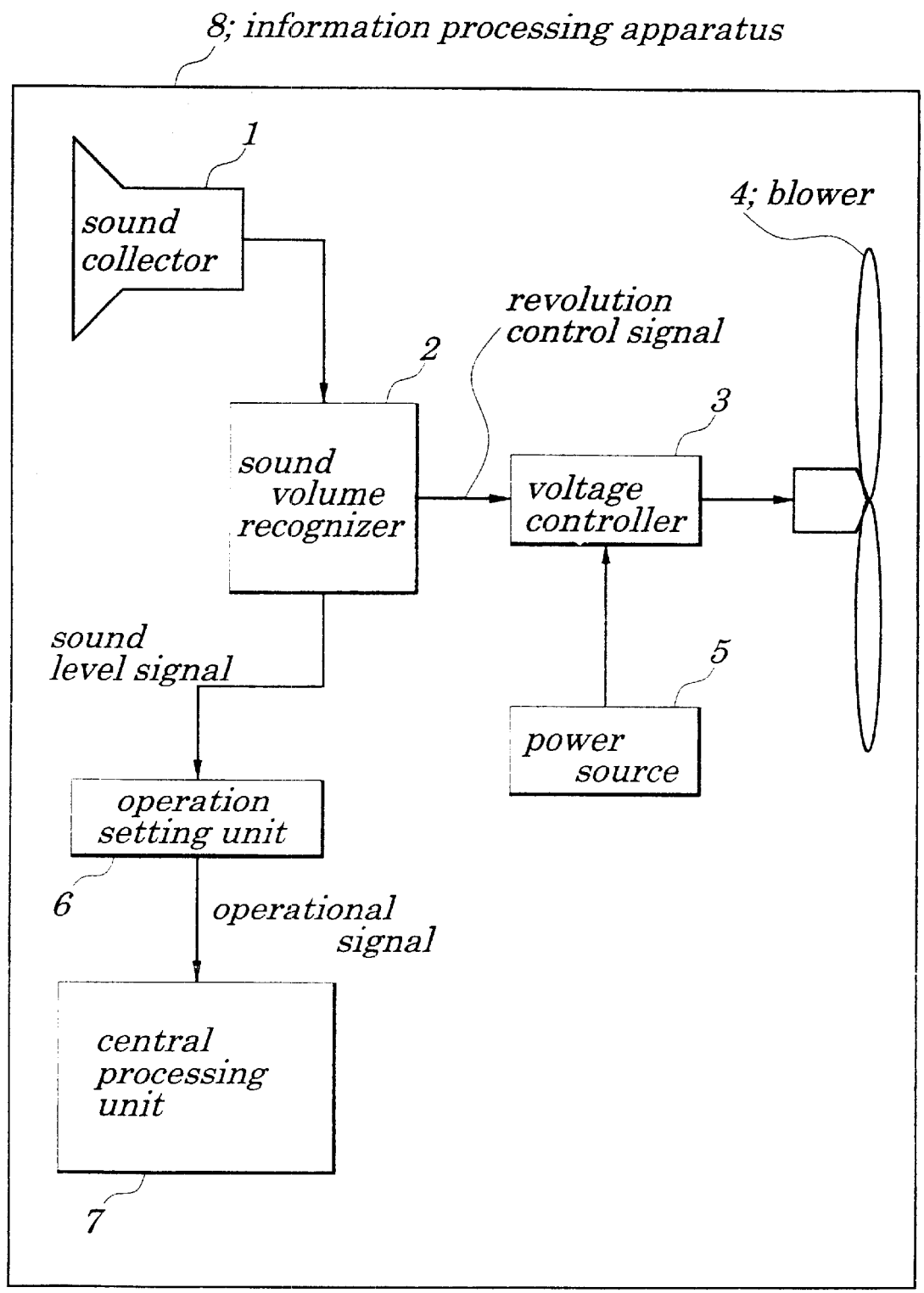
FIG. 1 is a block diagram showing an information processing apparatus in an embodiment of the present invention.
Figure 2:
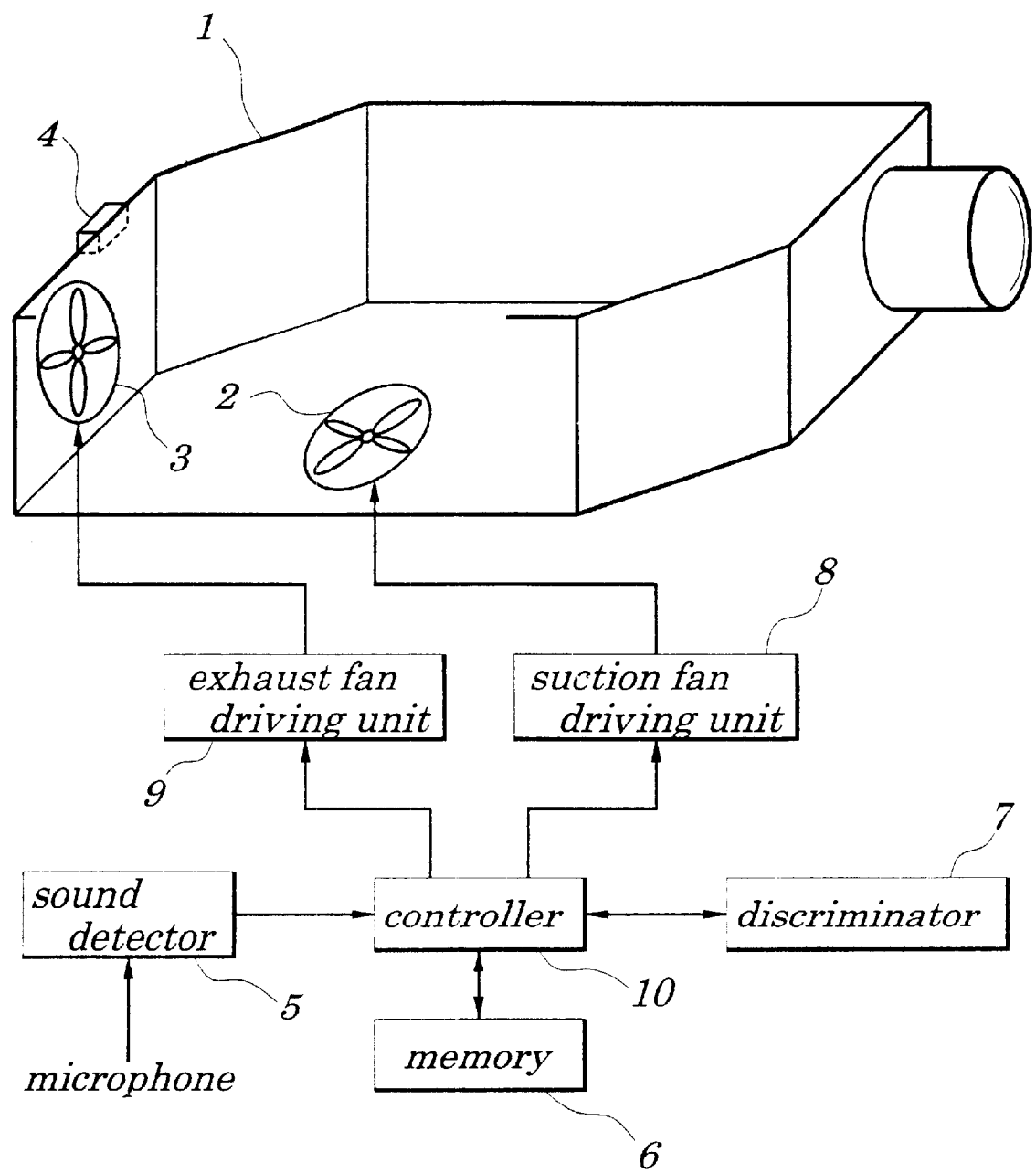
FIG. 2 is a block diagram for explaining a related art.

Hereinafter, an embodiment of the present invention will be described with reference to the drawing.

FIG. 1 is a block diagram showing an information processing apparatus which performs a control method of the same in the embodiment. Referring to FIG. 1, the information processing apparatus 8 constitutes: a power source 5 or supplying an electric power; a sound collector 1 for collecting ambient noise of surroundings where the apparatus 8 is installed; a sound volume recognizer 2 that calculates a measuring value form the sound volume outputted form the sound collector 1, outputs a rotational speed control signal and a sound level signal; a voltage controller 3 for controlling the power supplied from power supply 5 to a blower 4 in response to the rotational speed control signal outputted from the sound volume recognizer 2; the blower 4 having a fan rotated by the power supplied from the voltage controller 3 to cool inside the apparatus; an operation setting unit 6 for outputting an operation signal used for a processing rate such that a cooling temperature produced by the blower 4 in response to the sound level signal from the sound volume recognizer 2 is in the range of operating the apparatus; and a central processing unit 7 operable at a processing rate or clock rate in accordance with the operational signal outputted form operation setting unit 6.

The embodiment will be described with reference to FIG. 1 in detail. The sound collector 1 transfers continuously the sound volume to the sound volume recognizer 2. The sound volume recognizer 2 calculates a measuring value from the sound volume to compare the measuring value with a reference value set in the range of operating the apparatus. When the measuring value is greater than the reference value, a high rotational speed control signal for rotating the blower 4 at high rotational speed is outputted to the voltage controller 3 from the sound volume recognizer 2 and a high sound level signal is outputted to the operation setting unit 6 therefrom. The sound volume recognizer 2 also outputs a low rotational speed control signal for rotating the blower 4 at low rotational speed to the voltage controller 3 and outputs a low sound level signal to the operation setting unit 6 when the measuring value is smaller than the reference value.

The voltage controller 3 transforms the power from power source 5 to supply a high power to the blower 4, for rotating the blower 4 at a high rotational speed when receiving the high rotational speed control signal. The voltage controller 3 also transforms the power from power source 5 to supply a low power to the blower 4, for rotating the blower 4 at a low rotational speed when receiving the low revolution control signal. Accordingly, the fan in blower 4 is rotated by the power to cool inside the apparatus 8.

The operation setting unit 6 examines the sound level signal received from the sound volume recognizer 2 to set a processing or clock rate of central processing unit 7. The operation setting unit 6 then outputs a high processing rate signal to the central processing unit 7 when the sound level signal is a high sound level signal and outputs a low processing rate signal thereto when it is a low sound level signal.

The central processing unit 7 performs a processing operation under a high rate clock frequency when receiving the high processing rate signal. While it performs the processing operation under a low rate clock frequency when receiving the low processing rate signal. Besides, when the apparatus is not accessed from outside, i.e. not in use, it is set to a standby state, reducing produced from the apparatus.

More specifically, operation will be described with reference to FIG. 1. In the case where ambient noise is installed is larger than the reference value, a high sound volume outputted form the sound collector 1 is transferred to the sound volume recognizer 2. The sound volume recognizer 2 calculates a measuring value from the high sound volume. It then outputs the high rotational speed control signal to the voltage controller 3 to rotate the blower 4 in high revolution since the measured value is greater than the reference value as a result of the comparison, and outputs the high sound level signal to the operation setting unit 6. The voltage controller 3, on receiving the high rotational speed control signal from the sound volume recognizer 2 transforms the power supplied form the power source 5 to supply a high power to blower 4 to be rotated at high rotational speed. The fan in blower 4 is then rotated at the high rotational speed, increasing cooling effect in the apparatus 8. At this time, the sound produced form blower 4 is high, but it is proportional or correspondent to the sound of surroundings where the apparatus 8 is installed. The operation setting unit 6 in receiving the high sound level signal also outputs the high processing rate signal to permit.

Central processing unit 7 to operate at a high processing rate. The central processing unit 7, on receiving the high processing rate signal performs a processing operation under the high rate clock frequency. At this time, the heat produced form central processing unit 7 is relatively large, but the temperature in the apparatus 8 is restrained due to the high rotational speed of the fan and high cooling effect.

In the case where the ambient noise is installed is relatively low, a low sound volume outputted from the sound collector 1 is transferred to the sound volume recognizer 2. The sound volume recognizer 2 calculates a measuring value and outputs a low rotational speed control signal to the voltage controller 3 to rotate the blower 4 at a low rotational speed since the measuring value is smaller than the reference value, and outputs a low sound level signal to the operation setting unit 6. The voltage controller 3, on receiving the low rotational speed control signal transforms the power supplied from the power source 5 to supply a low power to the blower 4. The fan in blower 4 is rotated at the low rotational speed, decreasing the noise produced by the blower 4 and also decreasing the cooling effect in the apparatus 8.

The operation setting unit 6, on receiving the low sound level signal also outputs a low processing rate signal to the central processing unit 7 for a processing operation at a low processing rate. The central processing unit 7, on receiving the low processing rate signal performs the processing operation at a low rate clock frequency changed over from the high processing rate. In the case where the apparatus 8 is not accessed from outside, it is set to a standby state, restraining the heat produced from the apparatus. At this time, the cooling effect is low due to the low rotational speed of the blower 4, but the heat output is also small and the temperature produced form the apparatus 8 is low, enhancing reliability of the apparatus.

It is thus apparent that the present invention is not limited to the above embodiments but may be changed and modified without departing from the scope and spirit of the invention.

What is claimed is:

1. A controller for controlling heat produced by an information processing apparatus comprising:

a blower unit including a fan;

a power supply for the blower unit;

a sound collector that generates a sound volume signal representing an ambient sound volume;

a sound volume recognizer unit responsive to the sound volume signal to calculate a sound level to compare the calculated sound level with a reference level and to output a rotational speed control signal and a sound level signal;

a control unit for controlling the power supplied from the power supply in response to the rotational speed control signal;

the blower fan being operated by the power source at a rotational speed determined by the rotational speed control signal to cool inside the information processing apparatus;

a central processing unit; and an operation setting unit for producing and outputting a processing rate control signal for the central processing unit in response of the sound level signal.

2. A controller according to claim 1, wherein the sound volume recognizer outputs a high rotational speed control signal to the voltage controller and outputs a high sound level signal to the operation setting unit when the calculated sound level is greater than the reference value.

3. A controller according to claim 1, wherein the sound volume recognizer outputs a low rotational speed control signal to the voltage controller and outputs a low sound level signal to the operation setting unit when the calculated sound level is smaller than the reference value.

4. A control method for an information processing apparatus including a CPU and a blower for cooling inside the apparatus comprising:

determining an ambient noise level;

calculating a sound level from the ambient noise level;

comparing the calculated sound level with a reference value to produce a rotational speed control signal and a sound level signal;

controlling power provided to the blower in response to the rotational speed control signal;

rotating a fan in the blower with the power to cool inside the apparatus;

producing an operational signal in response to the sound level signal; and operating the central processing unit at a clock rate in accordance with the operational signal.

5. A control method according to claim 4 wherein a high value of the rotational speed control signal and a high sound level signal are produced when the calculated sound level is greater than the reference value.

6. A control method according to claim 4 wherein a low value of the rotational speed control signal and a low sound level signal are produced when the calculated sound level is smaller than the reference value.

7. A control method according to claim 4 wherein the step (f) includes steps of performing a processing operation under a high rate clock frequency when the operational signal is a high rate operational signal, performing the processing operation under a low rate clock frequency when the operational signal is a low rate operational signal, and making the apparatus to be set to a standby state and restrain the calorific value caused by the apparatus.

8. A controller according to claim 1, wherein the voltage controller operates the fan at a high rotational speed when the ambient sound volume is high and operates the fan at a rotational speed which is lower than the high rotational speed when the ambient sound volume is low.

9. A controller according to claim 8 wherein the operation setting unit operates the central processing unit at a high clock rate when the ambient sound volume is high, and operates the central processing unit at a clock rate which is lower than the high clock rate when the ambient sound volume is low.

10. A controller according to claim 1, wherein the operation setting unit operates the central processing unit at a high clock rate when the ambient sound volume is high, operates the central processing unit at a clock rate which is lower than the high clock rate when the ambient sound volume is low and places the central processing unit in a standby state to limit the heat generated thereby when it is not in use.

11. A control method according to claim 4, wherein the fan is operated at a first rotational speed when the ambient sound level is higher than a value corresponding to the reference value and is operated at a second rotational speed lower than the first rotational speed when the ambient sound level is lower than the value corresponding to the reference value.

12. A control method according to claim 11 wherein the central processing unit is operated at a first clock rate when the ambient sound volume is high, and is operated at a second clock rate which is lower than the first clock rate when the ambient sound volume is low.

13. A control method according to claim wherein the central processing unit is operated at a first clock rate when the ambient sound volume is high, and is operated at a second clock rate which is lower than the first clock rate when the ambient sound volume is low; and further including the step of placing the central processing unit in a standby state to limit the heat generated thereby when it is not in use.

* * * * *